US006983646B2

(12) United States Patent
Sawada et al.

(10) Patent No.: US 6,983,646 B2
(45) Date of Patent: Jan. 10, 2006

(54) ATMOSPHERIC PRESSURE DETECTION DEVICE OF FOUR-STROKE ENGINE AND METHOD OF DETECTING ATMOSPHERIC PRESSURE

(75) Inventors: Yuichiro Sawada, Shizuoka (JP); Michiyasu Takahashi, Shizuoka (JP)

(73) Assignee: Yamaha Hatsudoki Kabushiki Kaisha, Iwata (JP)

( * ) Notice: Subject to any disclaimer, the term of this patent is extended or adjusted under 35 U.S.C. 154(b) by 60 days.

(21) Appl. No.: 10/493,722

(22) PCT Filed: Oct. 22, 2002

(86) PCT No.: PCT/JP02/10946

§ 371 (c)(1),
(2), (4) Date: Apr. 26, 2004

(87) PCT Pub. No.: WO03/038262

PCT Pub. Date: May 8, 2003

(65) Prior Publication Data

US 2004/0244471 A1 Dec. 9, 2004

(30) Foreign Application Priority Data

Oct. 31, 2001 (JP) .............................. 2001-335477

(51) Int. Cl.
*G01M 15/00* (2006.01)
(52) U.S. Cl. .................................................. 73/118.1
(58) Field of Classification Search .................. 73/116, 73/117.2, 117.3, 118.1, 118.2, 119 A
See application file for complete search history.

(56) References Cited

U.S. PATENT DOCUMENTS

| 4,696,275 A | * | 9/1987 | Kushi et al. ................. 123/478 |
| 5,631,412 A | * | 5/1997 | Tomisawa ................... 73/118.2 |
| 5,698,779 A | | 12/1997 | Yoshioka |
| 6,754,611 B2 | * | 6/2004 | Nagashima et al. ......... 702/183 |
| 6,804,995 B2 | * | 10/2004 | Kawano ..................... 73/118.1 |
| 2003/0015179 A1 | * | 1/2003 | Kawano ..................... 123/520 |

FOREIGN PATENT DOCUMENTS

| EP | 0 183 265 A2 | 6/1986 |
| JP | 63-159641 | 7/1988 |
| JP | 08-326581 | 12/1996 |
| JP | 10-227252 | 8/1998 |
| JP | 11-036960 | 2/1999 |
| JP | 2000-110618 | 4/2000 |
| JP | 2000-170582 | 6/2000 |

\* cited by examiner

*Primary Examiner*—Eric S. McCall
(74) *Attorney, Agent, or Firm*—Hogan & Hartson, LLP

(57) ABSTRACT

The atmospheric pressure is detected accurately without using an atmospheric pressure sensor.

The atmospheric pressure is obtained from an intake air pressure just before an inlet valve opens by detecting an intake air pressure. Since the intake air pressure just before the inlet valve opens becomes unstable when the engine load is large, the atmospheric pressure is calculated from an intake air pressure just before the inlet valve opens when the engine load is small. In addition, since the intake air pressure just before the inlet valve opens depending upon engine rotational speeds, the atmospheric pressure is calculated from an intake air pressure just before the inlet valve opens when the engine rotational speed resides in a predetermined rotational speed area.

4 Claims, 10 Drawing Sheets

ATMOSPHERIC PRESSURE DETECTION DEVICE OF FOUR-STROKE ENGINE AND METHOD OF DETECTING ATMOSPHERIC PRESSURE

TECHNICAL FIELD

The present invention relates to an apparatus and method for detecting an atmospheric pressure for a four-stroke engine, which is preferable for, for example, a four-stroke engine with a fuel injection system for injecting fuel.

BACKGROUND ART

In recent years, with the spread of fuel injection devices called injectors, the control of fuel injection timing and fuel injection volume, in other words, air-fuel ratio becomes easier, and this has enabled to promote increase in output, reduction in fuel consumption and purification of exhaust emissions. Among these, in particular, as to the timing of injecting fuel, it is a common practice to detect, strictly speaking, the state of an inlet valve, or, generally speaking, the phasic state of a camshaft so as to inject fuel to the state so detected. However, a so-called cam sensor for detecting the phasic state of the camshaft is expensive, and in particular, with motorcycles, there are many cases where the cam sensor cannot be adopted due to a problem of the enlargement of a cylinder head. Due to this, for example, JP-A-10-227252 proposes an engine control system for detecting the phasic state of a crankshaft and an intake air pressure so as to then detect the stroke state of a cylinder. Consequently, since the stroke state can be detected without detecting the phase of the camshaft, it becomes possible to control the fuel injection timing to the stroke state so detected.

Incidentally, in order for fuel to be injected from the fuel injection device as described above, fuel in a fuel tank has to be pressurized with a pump so as to be supplied to the fuel injection system. As has been known, since the pressure of fuel pressurized by the pump fluctuates, a pressure regulator valve called a regulator is used to regulate an upper limit value of the pressure of the fuel so supplied. In the case of motorcycles, it is a common practice to provide the regulator in the close vicinity of the fuel injection device, with an atmosphere into which fuel is injected by the fuel injection device, for example, a pressure within an induction pipe being normally used as a back pressure, a predetermined regulator control pressure normally set by a spring is designed to be raised from there. Consequently, the pressure of injected fuel which is made up of a differential pressure between the pressure of fuel supplied to the fuel injection device and the atmosphere into which fuel is injected is always equal to the regulator control pressure of the regulator.

When the regulator is provided in the close vicinity of the fuel injection device like this, however, a return piping for returning a portion of fuel which is restricted by the regulator to the fuel tank is required for each fuel injection device. In addition, generally, in most cases, regulators are manufactured by a manufacturer of pumps, and in the event that the pump and the regulator are designed to be disposed separately, pumps and regulators are delivered separately, and this increases the number of components and makes it impossible to attempt to attain a reduction in production costs that would otherwise be attained by getting them assembled together. To deal with this, it is conceivable to dispose the regulator on a pump side or to get the pump and the regulator assembled together. With this construction, not only can the necessity of the return piping for returning fuel be obviated but also the reduction in number of components and in production costs can be attained.

In the event that the regulator is disposed on the pump side as has been described above, since the back pressure of the regulator becomes the atmospheric pressure, the pressure of fuel supplied to the fuel injection device becomes substantially constant (a change in atmospheric pressure due to change in altitude changes the pressure of fuel). On the other hand, as is the case, in particular, with motorcycles, in case there is no surge tank along the length of the induction pipe, the pressure in the induction pipe into which fuel is injected, namely the pressure in the fuel injection atmosphere tends to fluctuate. Namely, the pressure of injected fuel constituted by a differential pressure between the pressure of fuel supplied to the fuel injection device and the pressure of atmosphere into which fuel is injected becomes unstable. In the event that the pressure of fuel injected becomes unstable as has been described above, the flow rate per unit time of fuel injected from the fuel injection device becomes unstable, and, for example, it becomes impossible to perform a control over a fuel injection volume needed to attain a desired air-fuel ratio only by fuel injection time. Then, in order to correct and control the fuel injection volume based on the pressure of injected fuel as is described above, for example, JP-8-326581 describes an engine control system. In this engine control system, an injected fuel pressure is detected, and the injected fuel pressure so detected is then integrated a predetermined period of time to obtain an area. Then, the area so obtained is compared with a reference area so as to correct and control the fuel injection volume.

Here, since the injected fuel pressure is the differential pressure between the pressure of fuel supplied to the fuel injection device and the pressure of the atmosphere into which fuel is injected, for example, when the pressure of fuel supplied to the fuel injection device is a pressure restricted by the regulator, the pressure is a value resulting from addition of the atmospheric pressure to the regulator controlled pressure, and, strictly speaking, in case the atmospheric pressure is not accurate, this means that the pressure of fuel supplied to the fuel injection device is not accurate. Then, while the use of an atmospheric pressure sensor is considered, since atmospheric pressure sensors are expensive and elaborate, the application to motorcycles is limited. In addition, in, for example, an engine control system in which a fuel injection quantity is determined by detecting a volume flow rate of air which flows into the engine, the detection of atmospheric pressure is needed to correct air density, and an apparatus and method for detecting an atmospheric pressure have been desired which can replace the atmospheric pressure sensor.

The invention was developed to solve the problems, and an object thereof is to provide an apparatus and method for detecting an atmospheric pressure for a four-stroke engine which can accurately detect an atmospheric pressure without using an atmospheric pressure sensor and which can attempt to reduce the production costs as well as the number of components.

DISCLOSURE OF THE INVENTION

With a view to solving the problems, according to a first aspect of the invention, there is provided an atmospheric pressure detecting apparatus for a four-stroke engine comprising a nonpressure regulator mounted on a pump for pressurizing fuel in a fuel tank for regulating an upper limit value for the pressure of fuel pressurized by the pump, a fuel injection device for injecting fuel the upper limit of which is regulated by the regulator into an air induction passageway of the four-stroke engine and an air intake control valve provided in the air induction passageway, the atmospheric pressure detecting apparatus for a four-stroke engine being characterized by provision of an intake air pressure detecting means for detecting an intake air pressure downstream of the air intake control valve, an operating condition detecting means for detecting an operating condition of the four-stroke engine and an atmospheric pressure detecting means for detecting an atmospheric pressure from an intake air pressure resulting when the load of the four-stroke engine is small and immediately before an inlet valve opens based on the operating condition of the four-stroke engine detected by the operating condition detecting means and the intake air pressure detected by the intake air pressure detecting means.

In addition, according to a second aspect of the invention, there is provided an atmospheric pressure detecting apparatus for a four-stroke engine as set forth in the second aspect of the invention, wherein the atmospheric pressure detecting means detects an atmospheric pressure from the intake air pressure resulting immediately before the inlet valve opens when the operating condition of the engine detected by the operating condition detecting means resides within a predetermined engine rotational speed area which has been set in advance.

In addition, according to a third aspect of the invention, there is provided an atmospheric pressure detecting method for a four-stroke engine comprising a nonpressure regulator mounted on a pump for pressurizing fuel in a fuel tank for regulating an upper limit value for the pressure of fuel pressurized by the pump, a fuel injection device for injecting fuel the upper limit of which is regulated by the regulator into an air induction passageway of the four-stroke engine and an air intake control valve provided in the air induction passageway, the atmospheric pressure detecting method for a four-stroke engine being characterized by the steps of detecting an intake air pressure downstream of the air intake control valve, detecting an operating condition of the four-stroke engine and detecting an atmospheric pressure from an intake air pressure resulting when the load of the four-stroke engine is small and immediately before an inlet valve opens based on the operating condition of the four-stroke engine so detected and the intake air pressure so detected.

In addition, according to a fourth aspect of the invention, there is provided an atmospheric pressure detecting method for a four-stroke engine as set forth in the third aspect of the invention, wherein an atmospheric pressure is detected from the intake air pressure resulting immediately before the inlet valve opens when the operating condition of the engine detected resides within a predetermined engine rotational speed area which has been set in advance.

BEST MODE FOR CARRYING OUT THE INVENTION

An embodiment of the invention will be described below.

Figure 1:
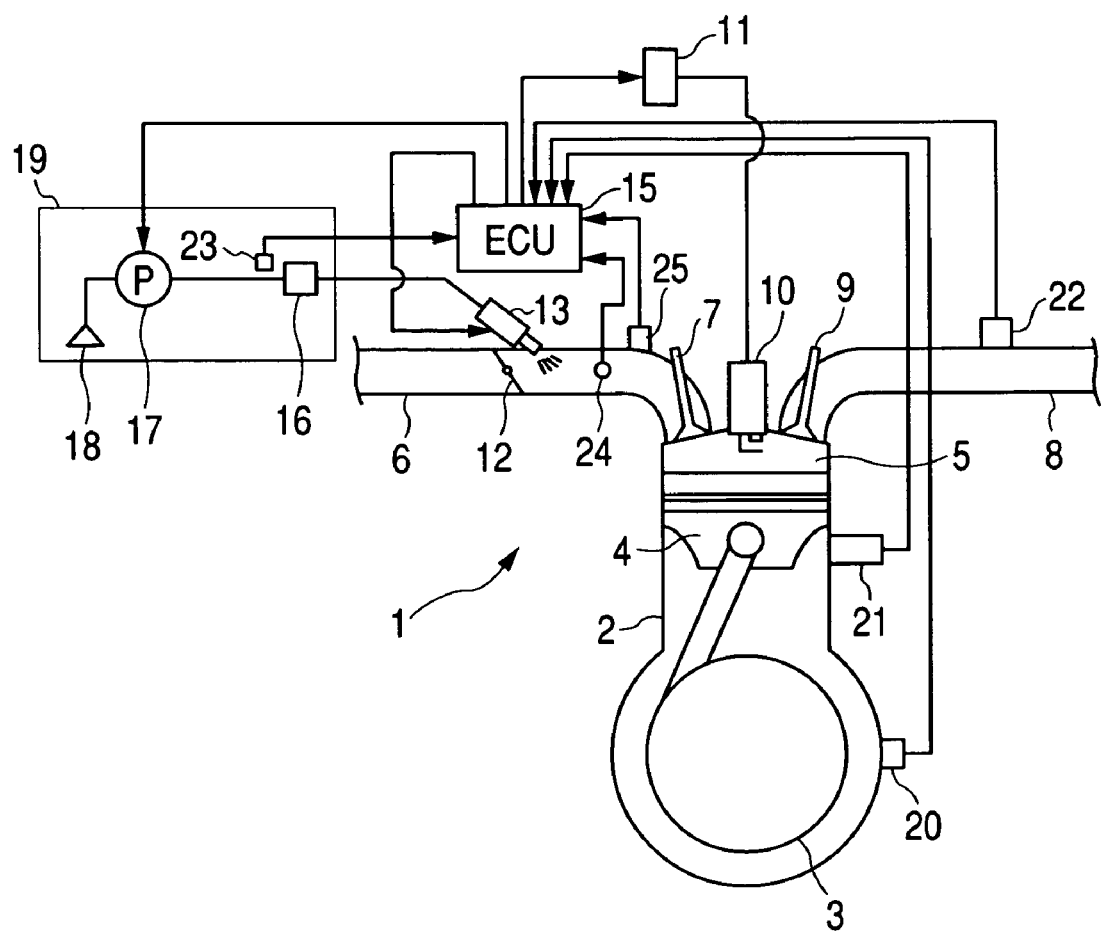
FIG. 1 is a schematic configuration diagram of a motorcycle engine and a control system therefor.

FIG. 1 is a schematic configuration diagram illustrating an example of a motorcycle engine and a control system therefore, for example. An engine 1 is a four-cylinder, four-stroke engine and includes a cylinder body 2, a crankshaft 3, a piston 4, a combustion chamber 5, an induction pipe (an induction passageway) 6, an inlet valve 7, an exhaust pipe 8, an exhaust valve 9, a sparking plug 10, and an ignition coil 11. In addition, a throttle valve (an air intake control valve) 12 that is opened and closed according to the opening of an accelerator is provided in the induction pipe 6, and an injector 13 functioning as a fuel injection device is provided upstream of the throttle valve 12 in the induction pipe 6. The injector 13 is connected to a filter 18, a fuel pump 17 and a regulator 16 which are disposed in the interior of a fuel tank 19. Note that the regulator 16 is such as to regulate an upper limit value for the pressure of fuel pressurized by the fuel pump 17, and when it is disposed in the fuel tank 19 as has been described above, the regulator 16 is designed such that a regulator control pressure which is set in advance is raised therefrom with the atmospheric pressure being used as a back pressure. Consequently, with respect to a pump discharge pressure lower than the regulator control pressure, the pump discharge pressure as it is becomes a fuel pressure (strictly speaking, a pump discharge pressure using the atmospheric pressure as the back pressure) that is supplied to the injector 13. In addition, this engine 1 is of a so-called independent induction system, and the injector 13 is provided for each induction pipe 6 for each cylinder.

The operating condition of the engine 1 is controlled by an engine control unit 15. Provided as a means for detecting control inputs into the engine control 15, namely the operating condition of the engine are a crank angle sensor 20 for detecting the rotating angle of the crankshaft 3, namely the phase thereof, a coolant temperature sensor 21 for detecting the temperature of the cylinder body 2 or coolant temperature, namely, the temperature of an engine main body, an exhaust air-fuel ratio sensor 22 for detecting the air-fuel ratio in the exhaust pipe 8, a fuel pressure sensor 23 for detecting the fuel discharge pressure of the fuel pump 17 as the pressure of fuel supplied to the injector 13, an intake air pressure sensor 24 for detecting the pressure of intake air in the induction pipe 6 and an intake air temperature sensor 25 for detecting the temperature in the induction pipe 6, namely the temperature of intake air. Then, the engine control unit 15 receives detection signals from these sensors and outputs control signals to the fuel pump 17, the injector 13 and the ignition coil 11.

Figure 2:
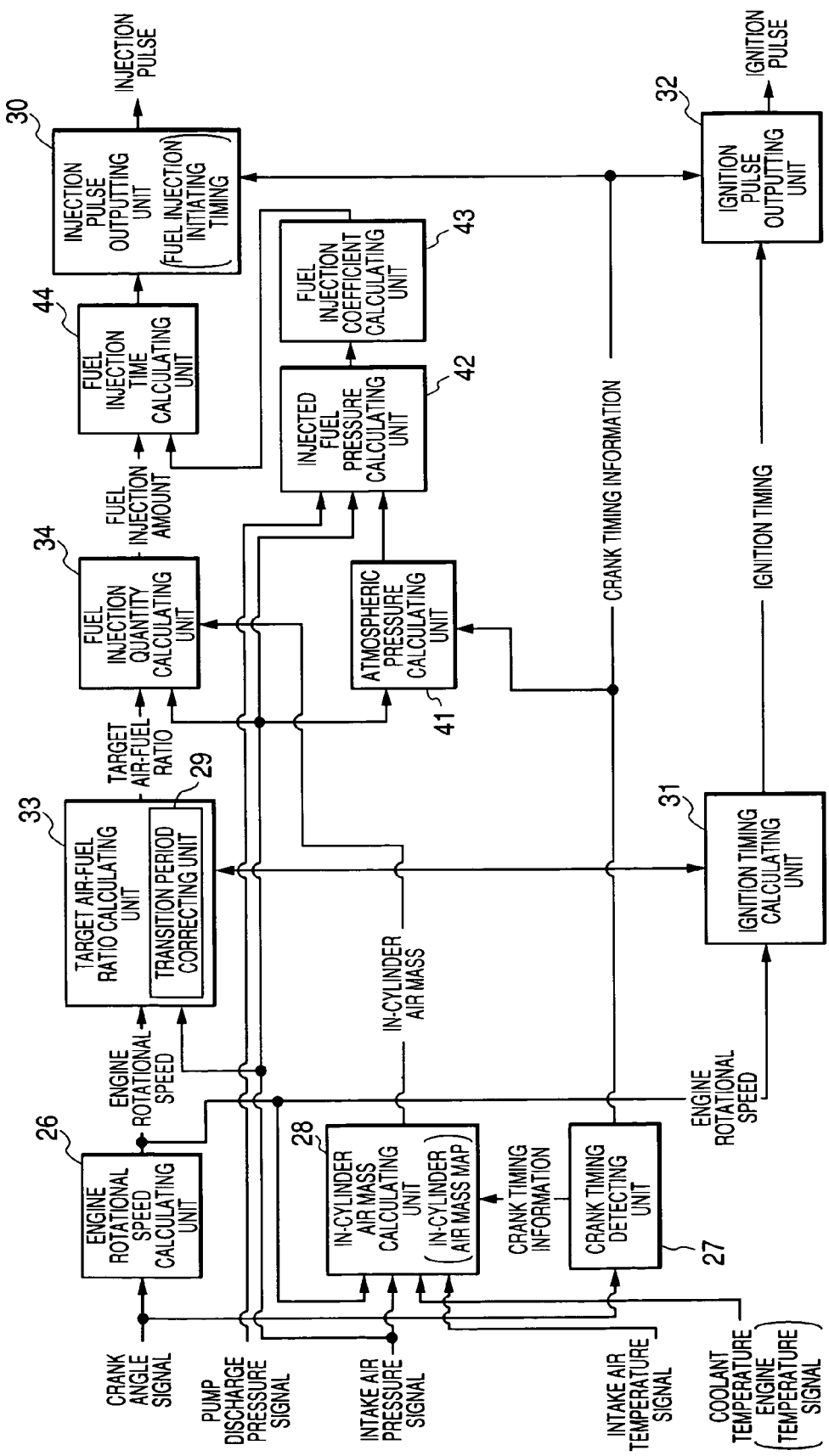
FIG. 2 is a block diagram showing an embodiment of an engine control system according to the invention.

The engine control unit 15 has a microcomputer, which is not shown. FIG. 2 is a block diagram illustrating an embodiment of an engine control process performed in the microcomputer in the engine control unit. This process includes an engine rotational speed calculating unit 26 for calculating an engine rotational speed from the crank angle signal, a crank timing detecting unit 27 for detecting crank timing information, namely the stroke state from similarly the crank angle signal and the intake air pressure signal, an in-cylinder air mass calculating unit 28 for reading the crank timing information detected by the crank timing detecting unit 27 and calculating an in-cylinder air mass (a quantity of intake air) from the intake air temperature signal, the coolant temperature signal, the intake air pressure signal and an engine rotational speed calculated by the engine rotational speed calculating unit 26, a target air-fuel ratio calculating unit 33 for calculating a target air-fuel ratio from an engine rotational speed calculated by the engine rotational speed calculating unit 26 and the intake air pressure signal, a fuel injection quantity calculating unit 34 for calculating a fuel injection quantity from a target air-fuel ratio calculated by the target air-fuel ratio calculating unit 33, the intake air pressure signal and an in-cylinder air mass calculated by the in-cylinder air mass calculating unit 28, an atmospheric pressure calculating unit 41 for calculating an atmospheric pressure from the intake air pressure signal and crank timing information detected by the crank timing detecting unit 27, an injected fuel pressure calculating unit 42 for calculating an injected fuel pressure from an atmospheric pressure calculated by the atmospheric pressure calculating unit 41, the pressure of fuel supplied to the injector 13 detected by the fuel pressure sensor 23 and the intake air pressure signal, a fuel injection coefficient calculating unit 43 for calculating a fuel injection coefficient from an injected fuel pressure calculated by the injected fuel pressure calculating unit 42, a fuel injection time calculating unit 44 for calculating a fuel injection time based on a fuel injection quantity calculated by the fuel injection quantity calculating unit 34 and a fuel injection coefficient calculated by the fuel injection coefficient calculating unit 43, an injection pulse outputting unit 30 for outputting an injection pulse towards the injector 13 from a fuel injection time calculated by the fuel injection time calculating unit 44 and crank timing information detected by the crank timing detecting unit 27, an ignition timing calculating unit 31 for calculating an ignition timing from an engine rotational speed calculated by the engine rotational speed calculating unit 26 and a target air-fuel ratio set by the target air-fuel ratio calculating unit 31 and an ignition pulse outputting unit 32 for reading crank timing information detected by the crank timing detecting unit 27 and outputting an ignition pulse towards the ignition coil 11 according to an ignition timing set by the ignition timing calculating unit 31.

The engine rotational speed calculating unit 26 calculates a rotational speed for the crankshaft which is an output shaft of the engine as an engine rotational speed from a time change rate of the crank angle signal.

Figure 3:
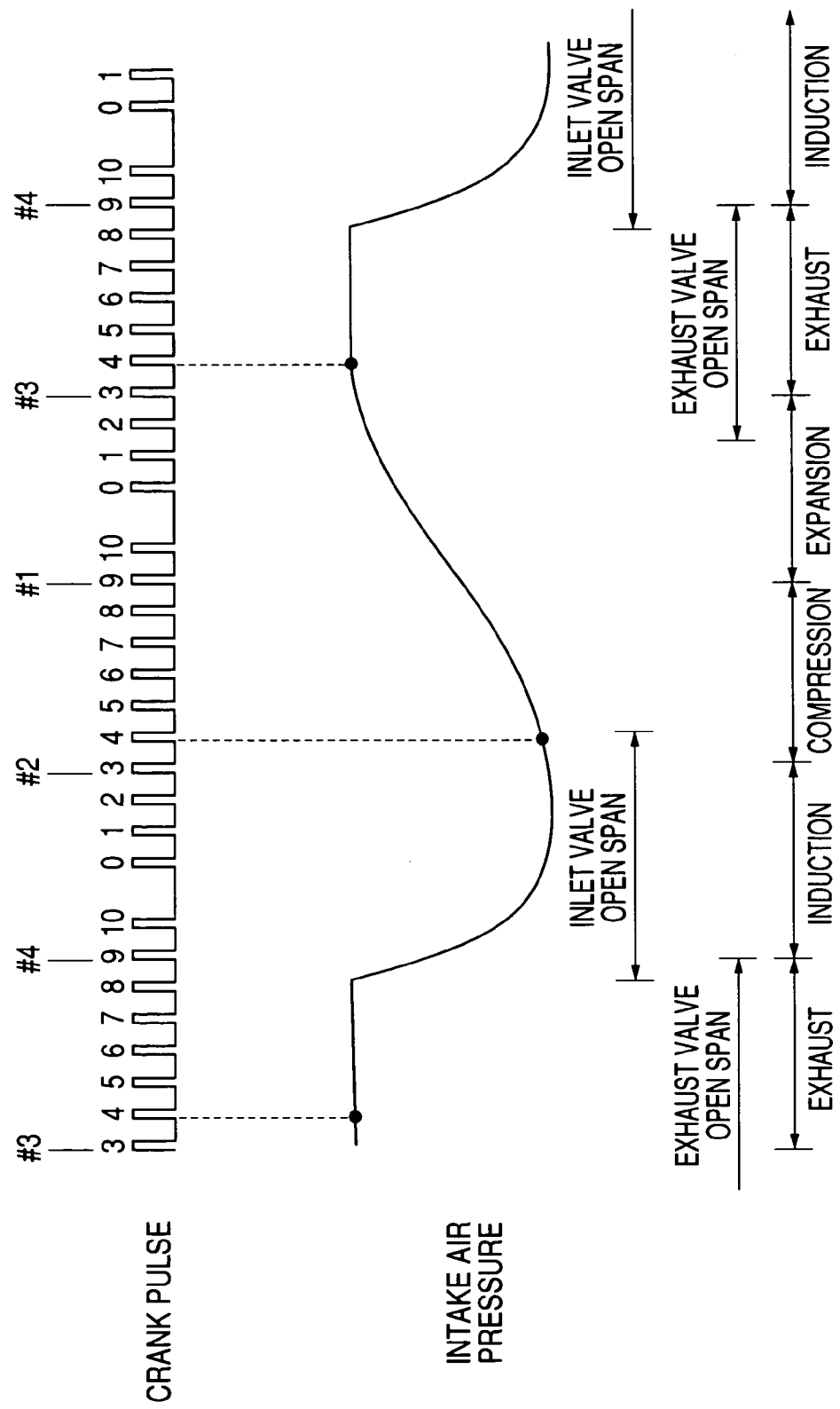
FIG. 3 is an explanatory diagram explaining a detection of a stroke condition from the phase of a crankshaft and an intake air pressure.

The crank timing detecting unit 27 has a similar configuration to a stroke determination device described the aforesaid JP-10-227252, thereby detects the stroke state of each cylinder as shown in FIG. 3 and outputs the stroke state so detected as crank timing information. Namely, in a four-stroke engine, since the crankshaft and the camshaft continue to rotate with a predetermined phase difference, when crank pulses are being read as shown in FIG. 3, for example, crank pulses of "4" shown in the figure correspond to either an exhaust stroke or a compression stroke. As is known, since, in the exhaust stroke, the exhaust valve is opened and the inlet valve is closed, the intake air pressure is high, and since the inlet valve still remains open at an initial stage of the compression stroke, the intake air pressure is low, or, even if the inlet valve is closed, the intake air pressure remains low due to the previous induction stroke. Consequently, a crank pulse indicated as "4" when the intake air pressure is low indicates that a second cylinder is in the compression stroke, and the second cylinder comes to the bottom dead center of the induction stroke when a crank pulse indicated as "3" is obtained. Thus, in case the stroke state of any of the cylinders can be detected like this, since the revolution in each cylinder occurs with the predetermined phase difference; for example, a crank pulse shown as "9" which follows the crank pulse shown as "3" which indicates the bottom dead center of the induction stroke of the second cylinder indicates the bottom dead center of an induction stroke of a first cylinder, a crank pulse shown as "3" which comes thereafter indicates the bottom dead center of an induction stroke of a third cylinder, and a crank pulse shown as "9" which comes thereafter indicates the bottom dead center of an induction stroke of a fourth cylinder. Then, the current stroke state can be detected in greater detail by interpolating intervals between the strokes with the rotational speed of the crankshaft.

Figure 4:
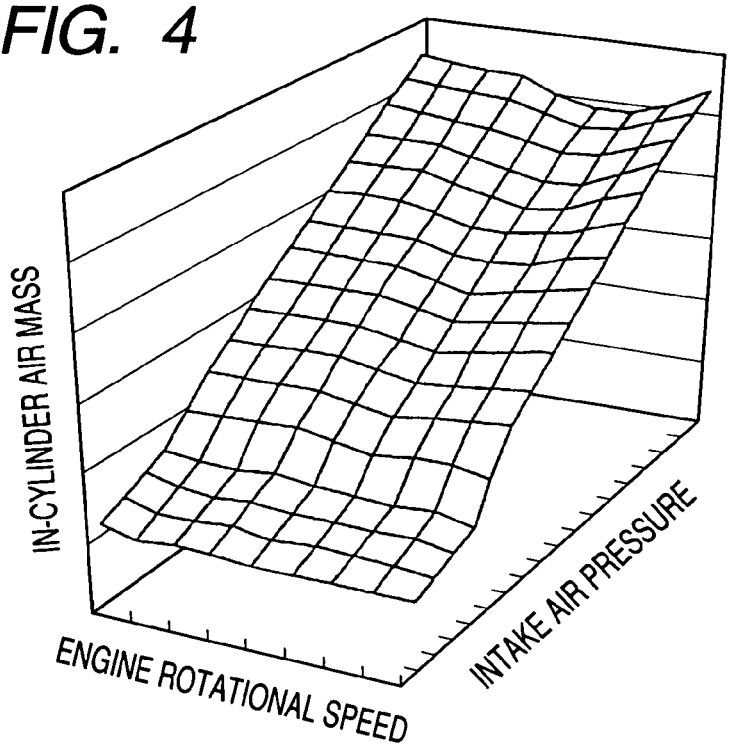
FIG. 4 is a map for calculating an in-cylinder air mass that is stored in an in-cylinder air mass calculating unit.

As shown in FIG. 4, the in-cylinder air mass calculating unit 28 has a three-dimensional map for calculating an in-cylinder air mass from the intake air pressure signal and an engine rotational speed calculated by the engine rotational speed calculating unit 26. With the three-dimensional map for in-cylinder air mass, an in-cylinder air mass may only have to be measured which results, for example, when the intake air pressure is changed while allowing the engine to actually rotate at a predetermined rotational speed, and the measurement can be implemented through a relatively simple experiment, whereby the map can be prepared easily. In addition, with an elaborate engine simulation, the map can be prepared using the same. Note that since the in-cylinder air mass changes as the temperature of the engine changes, the in-cylinder air mass may be corrected using the coolant temperature (engine temperature) signal.

Figure 5:
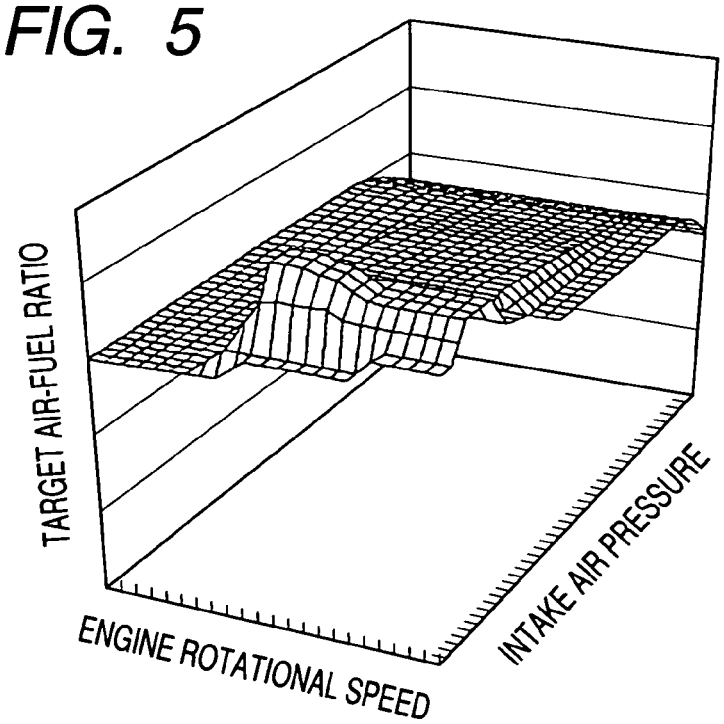
FIG. 5 is a map for calculating a target air-fuel ratio that is stored in a target air-fuel ratio calculating unit.

As shown in FIG. 5, the target air-fuel ratio calculating unit 33 has a three-dimensional map for calculating a target air-fuel ratio from an engine rotational speed calculated by the engine rotational speed calculating unit 26. The three-dimensional map can be set theoretically to some extent. Generally, the air-fuel ratio correlates with torque, and with a small air-fuel ratio, namely, with more fuel and less air, torque increases, whereas the efficiency decreases. On the contrary, with a large air-fuel ratio, namely, with less fuel and more air, torque decreases, whereas the efficiency increases. A state in which the air-fuel ratio is small is referred to as rich, whereas a state in which the air-fuel ratio is large is referred to as lean. A leanest state is referred to as a so-called ideal air-fuel ratio or stoichiometric state which provides an air-fuel ratio with which gasoline burns out perfectly, namely an air-fuel ratio of 14.7.

An engine rotational speed indicates an operating condition of the engine, and in general, the air-fuel ratio is made large on a high rotational speed side and small on a low rotational speed side. This is because the torque response is increased on the low rotational speed side, and the response of the rotating state is increased on the high rotational speed side. In addition, the intake air pressure indicates an engine loaded state such as throttle opening, and in general, with a large engine load, namely, when the throttle opening is large and the intake air pressure is large, the air-fuel ratio is made small, whereas with a small engine load, namely when the throttle opening is small and the intake air pressure is small, the air-fuel ratio is made large. This is because importance is attached to torque when the engine load is large, whereas importance is attached to efficiency when the engine load is small.

Thus, the target air-fuel ratio is a value whose physical meaning is easy to be grasped, and consequently, the target air-fuel ratio can be set to some extent in such a manner as to match a required output property of the engine. Of course, it goes without saying that the engine can be tuned to match the actual engine output properties of a vehicle.

Figure 6:
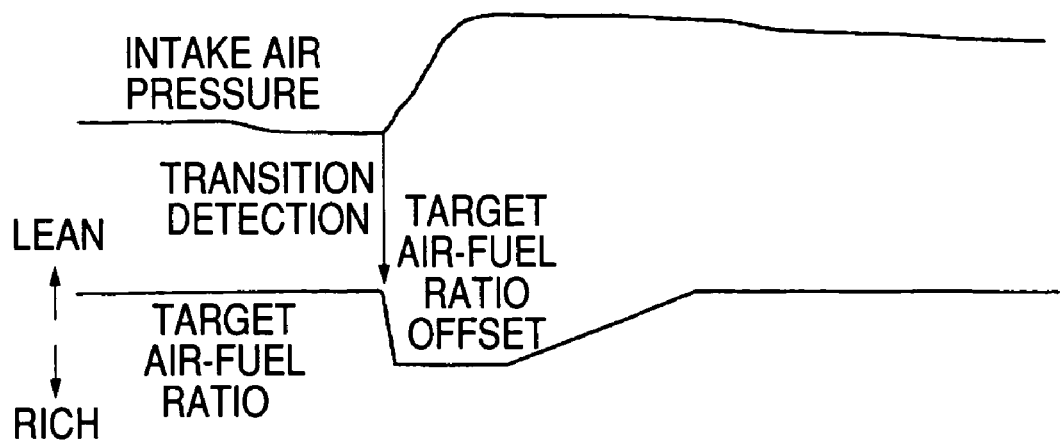
FIG. 6 is an explanatory diagram explaining the function of a transition period correcting unit.

In addition, the target air-fuel calculating unit 33 has a transition period correcting unit 29 for detecting a transition period of the engine, or specifically speaking, an accelerated state or a decelerated state of the engine and correcting the target air-fuel ratio to match the state of the engine so detected. For example, as shown in FIG. 6, since the intake air pressure also results from of a throttle operation, when the intake pressure becomes large, it is understood that the throttle is opened with an acceleration being on demand, namely that an acceleration is under way. When such an accelerated state is detected, for example, the target air-fuel ratio is temporarily set to a rich side to match the accelerated state so detected, and thereafter, the target air-fuel ratio so set is then returned to the original target air-fuel ratio. As the way of returning the set target air-fuel ratio to the original target air-fuel ratio, existing approaches can be made use of which includes an approach in which a weighting coefficient for a weighting average, for example, between the air-fuel ratio which was set to the rich side in the transition period and the original air-fuel ratio is gradually changed. In contrast, when a decelerated state is detected, the original target air-fuel ratio is set to the lean side so as to attach importance to the efficiency.

Figure 7:
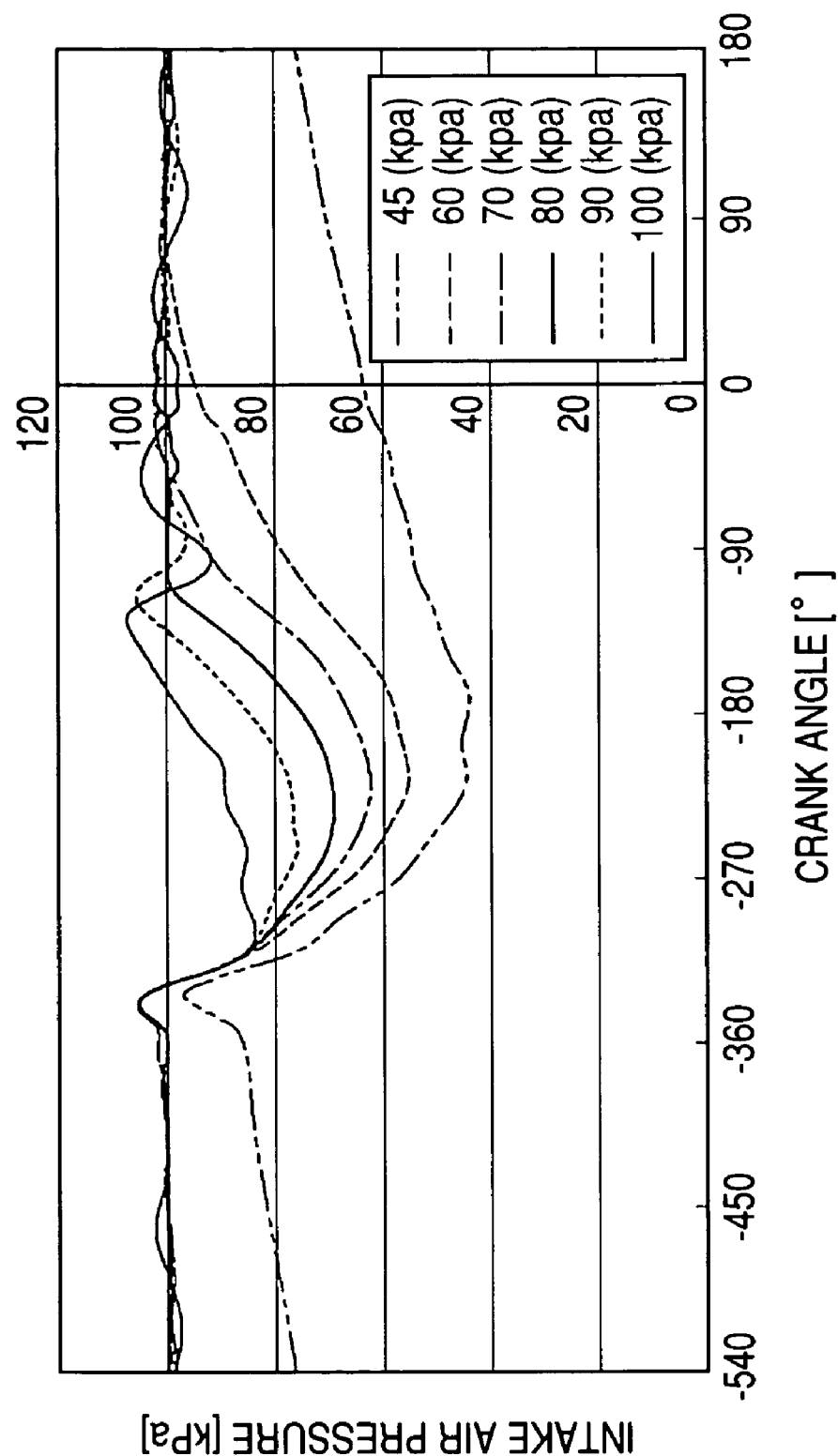
FIG. 7 is an explanatory diagram illustrating a correlation between a crank angle, namely a stroke and an intake air pressure.

On the other hand, the atmospheric pressure calculating unit 41 calculates an atmospheric pressure from the intake air pressure signal and the crank timing information. FIG. 7 represents intake air pressures relative to phases of the crankshaft, namely crank timing information, and each curve corresponds to an engine load when the crank angle is (−180°) For example, a minimum engine load is shown as 45 kPa, and a maximum engine load is shown as 100 kPa (as has been described previously, intake air pressure changes according to throttle opening). In the figure, an induction stroke is started when or after the crank angle has reached (−360°). Then, the intake air pressure remains almost stable just before the induction stroke, namely in the vicinity of the crank angle of (−360°), and as will be described later on, the value of the intake air pressure becomes the atmospheric pressure. This is because, with an engine having no turbo charger, the intake air pressure becomes stable when it is in the order of the atmospheric pressure, and consequently, in this embodiment, an intake air pressure just before the induction stroke, namely just before the inlet valve opens is detected as the atmospheric pressure. As is clear from the figure, however, since the intake air pressure is slightly unstable when the engine load is heavy, the atmospheric pressure is detected using an intake air pressure when the engine load resides in a light area.

Figure 8:
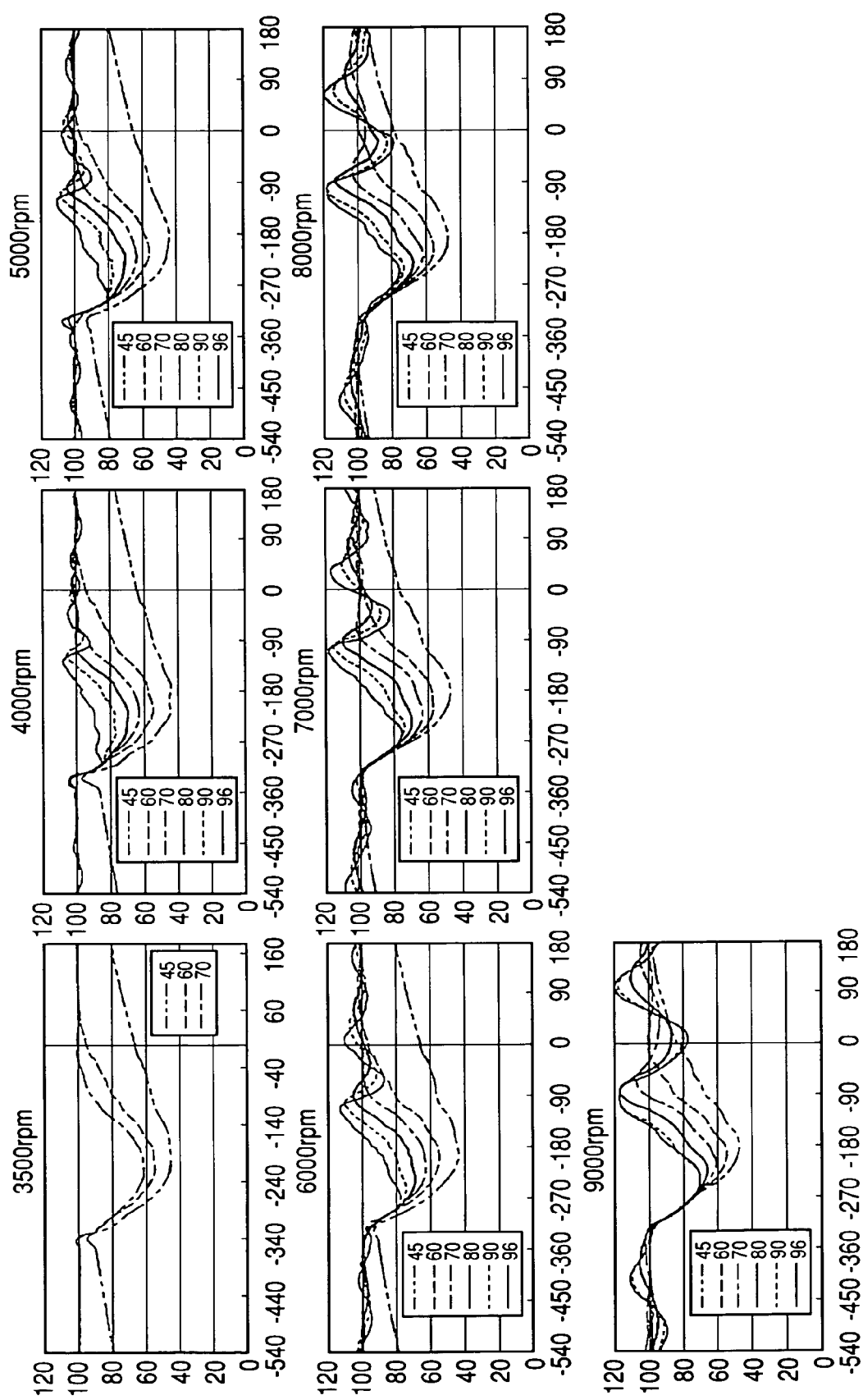
FIG. 8 shows explanatory diagrams illustrating correlations between a crank angle, namely a stroke and an intake air pressure for engine rotational speeds.
Figure 9:
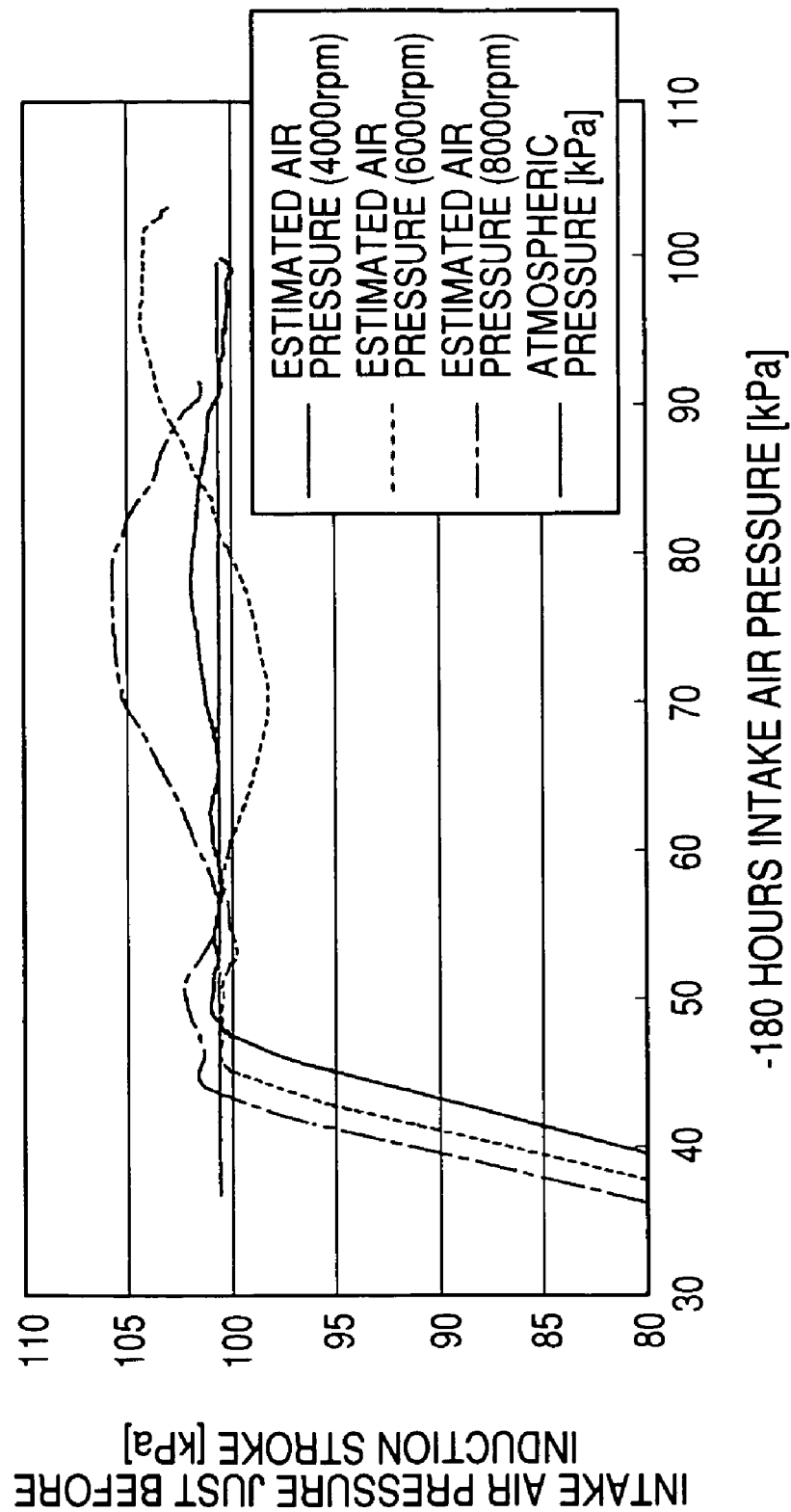
FIG. 9 is an explanatory diagram illustrating a correlation between an engine load and an intake air pressure immediately prior to an induction stroke.

FIG. 8 illustrates states of the intake air pressure which changes as the engine rotational speed changes. As is clear from the figure, the intake air pressure just before the inlet valve opens becomes unstable depending upon engine rotational speeds even under the same engine load. FIG. 9 illustrates a relationship between an intake air pressure just before an induction stroke and an engine load based upon the results of the state changes by representing an intake air pressure, namely an engine load when the crank angle is (−180°) on an axis of ordinates and similarly the intake air pressure just before the induction stroke on an axis of abscissas and using engine rotational speed as a parameter. Consequently, when attempting to be stricter, engine rotational speed may be added as one of parameters to detect the atmospheric pressure such that an engine rotational speed area for calculating an intake air pressure just before the inlet valve opens as the atmospheric pressure according to engine load is set, and the atmospheric pressure is detected from the intake air pressure just before the induction stroke only when the engine rotational speed area is reached.

Figure 10:
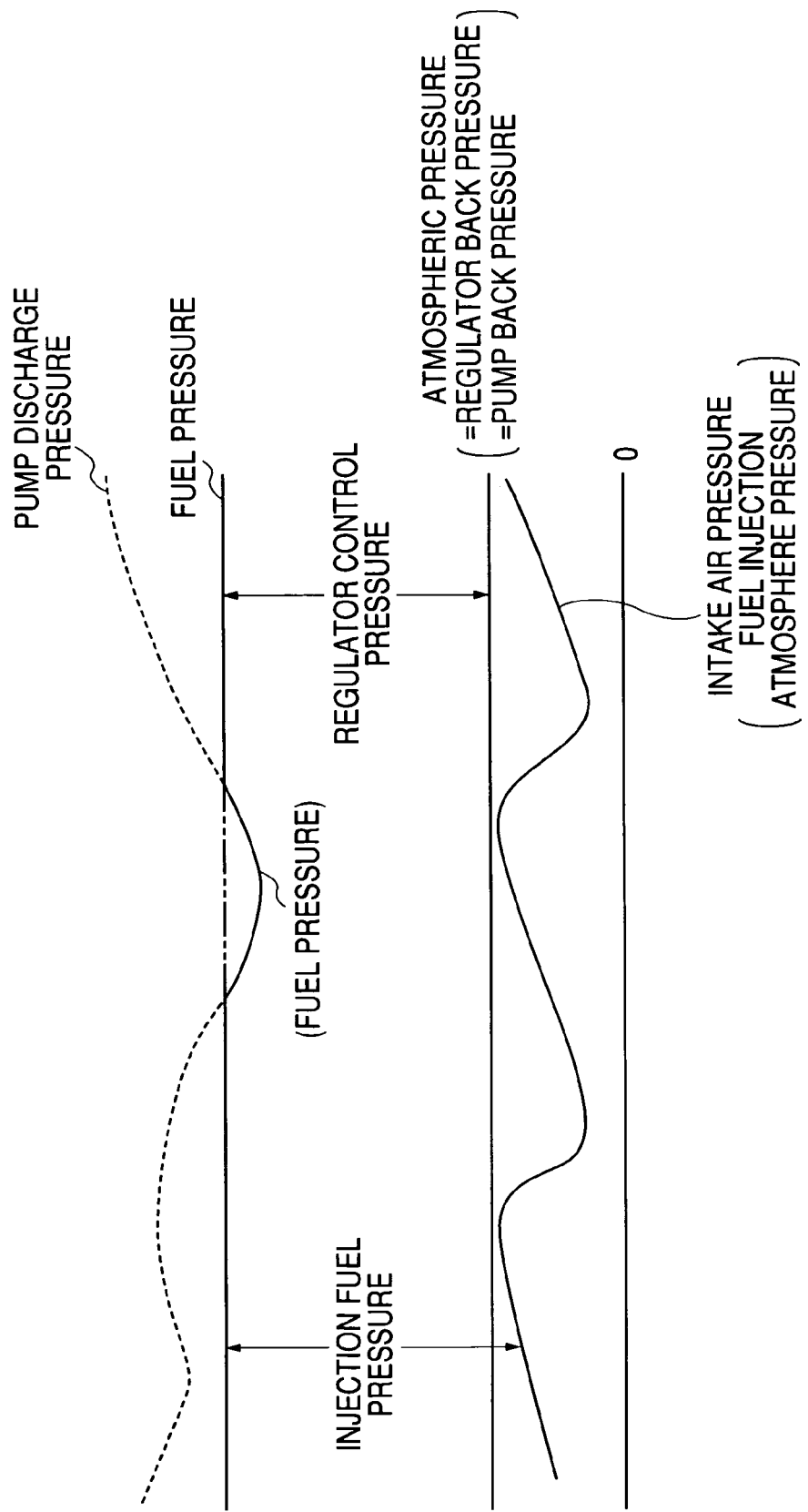
FIG. 10 is an explanatory diagram illustrating a correlation among a fuel pressure, an intake air pressure which is the pressure of an atmosphere and an injected fuel pressure.

The injected fuel pressure calculating unit 42 is such as to calculate an injected fuel pressure which is constituted by a differential pressure between the fuel pressure and the pressure of an atmosphere into which fuel is injected based upon the intake air pressure, the pump discharge pressure and the atmospheric pressure calculated by the atmospheric pressure calculating unit 41. FIG. 10 illustrates a relationship among fuel pressure, intake air pressure which is the pressure of an atmosphere and injected fuel pressure. In a case where the fuel pump 17 and the regulator 16 are provided on the fuel tank side as is found in this embodiment, back pressures of the pump and the regulator both become the atmospheric pressure (the fuel tank is not perfectly airtight). Both the pump discharge pressure and regulator control pressure rise on this atmospheric pressure, and when the pump discharge pressure is smaller than the regulator control pressure, the pump discharge pressure becomes the fuel pressure, whereas when the pump discharge pressure is equal to or larger than the regulator control pressure, the regulator control pressure becomes the fuel pressure. After a fuel pressure has been calculated by such comparisons, the intake air pressure (the fuel injection atmosphere pressure) is subtracted therefrom to calculate an injected fuel pressure. In particular, in the case of motorcycles, since no surge tank is provided along the induction pipe, the intake air pressure fluctuates as shown, and as will be described later on, in order to control fuel injection quantity by fuel injection time, the injected fuel pressure needs to be detected accurately. In this embodiment, as has been described above, the atmospheric pressure can be detected from the intake air pressure, and furthermore, the injected fuel pressure can accurately be detected from the pump discharge pressure and the intake air pressure, whereby the production costs can be attempted to be reduced by such an extent that no atmospheric pressure sensor is needed.

Next, the fuel injection coefficient calculating unit 43 calculates a fuel injection coefficient for calculating a fuel injection time according to an injected fuel pressure calculated by the injected fuel pressure calculating unit 42. Firstly, assuming that fuel density is $\rho$, the velocity of flow of fuel supplied to the injector 13 is $v_2$, the pressure of fuel supplied to the injector 13 is $P_1$, the velocity of flow of fuel injected from the injector 13 into the induction pipe is $v_2$, and the atmosphere pressure of fuel injected from the injector 13, namely the intake air pressure is $P_2$, since the velocity of flow v1 of fuel supplied to the injector is regarded as substantially "0", the following equation (1) is established from Bernoulli's postulate.

$$P_1 = \rho \cdot v_2^2 / 2 + P2 \qquad (1)$$

When this is solved for the velocity of flow $v_2$ of fuel injected into the induction pipe, the following equation (2) is obtained.

$$V_2 = (2(P1-P2)/\rho)^{1/2} \qquad (2)$$

where, (P1–P2) in the equation (2) is the injected fuel pressure calculated by the injected fuel pressure calculating unit 42, and assuming that it is represented by P here and the cross-sectional area of an injection hole of the injector 13 is S, the mass M of fuel per unit time injected from the injector 13 is represented by the following equation (3).

$$M = S \cdot v_2 \cdot \rho = S \cdot (2\rho \cdot p)^{1/2} \qquad (3)$$

It is understood from this that the mass M of fuel injected from the injector 13 per unit time is proportional to the value of a square root of the injected fuel pressure P.

Then, for example, an injected fuel pressure $P_0$ which constitutes a reference is set, and assuming that a fuel injection coefficient (injected fuel flow rate property coefficient) with which a unit mass of fuel is injected when the reference injected fuel pressure $P_0$ is reached, the fuel injection coefficient (injected fuel flow rate property coefficient) $Q_t$ with which the unit mass of fuel is injected when the injected fuel pressure is P is given by the following equation (4).

$$Q_t = Q_{t0} \times (P0/P)^{1/2} \qquad (4)$$

Consequently, a fuel injection time can be calculated by multiplying this fuel injection coefficient (injected fuel flow rate property coefficient) $Q_t$ by the fuel injection quantity.

Consequently, the fuel injection time calculating unit 44 calculates a fuel injection time T by multiplying a fuel injection quantity V calculated by the fuel injection quantity calculating unit 34 by the fuel injection coefficient (injected fuel flow rate property coefficient) $Q_t$. Namely, in processes performed in the fuel injection time coefficient calculating unit 43 and the fuel injection time calculating unit 44, when the value of a product obtained from the injected fuel flow rate property coefficient $Q_{t0}$ obtained when the reference injected fuel pressure is $P_0$, the fuel injection quantity V to attain a desired air-fuel ratio and the value of the root square of the reference injected fuel pressure value $P_0^{1/2}$ is set to a predetermined value, a fuel injection time T calculated becomes a value obtained when the predetermined value is divided by the value of the root square of the reference injected fuel pressure value $P_0^{1/2}$.

Then, the injection pulse outputting unit 30 calculates a fuel injection initiating timing from crank timing information detected by the crank timing detecting unit 27 and outputs an injection pulse to the injector 13 based on the fuel injection time calculated by the fuel injection time calculating unit 44.

Thus, in this embodiment, since the fuel pump 17 and the regulator 16 are both provided on the fuel tank 19 side, the differential fuel between the pressure of fuel supplied to the injector 13 and the pressure of the atmosphere into which fuel is injected, namely the intake air pressure is detected as the injected fuel pressure, and the time for which fuel is injected from the injector 13 is controlled based on the root square value of the injected fuel pressure so detected, neither an integration of injected fuel pressure nor many maps are needed, whereby the process load can be reduced, and the fuel pump 17 and the regulator 16 can be assembled to a single assembly, thereby making it possible to reduce the number of components and the production costs can be reduced.

Figure 11:
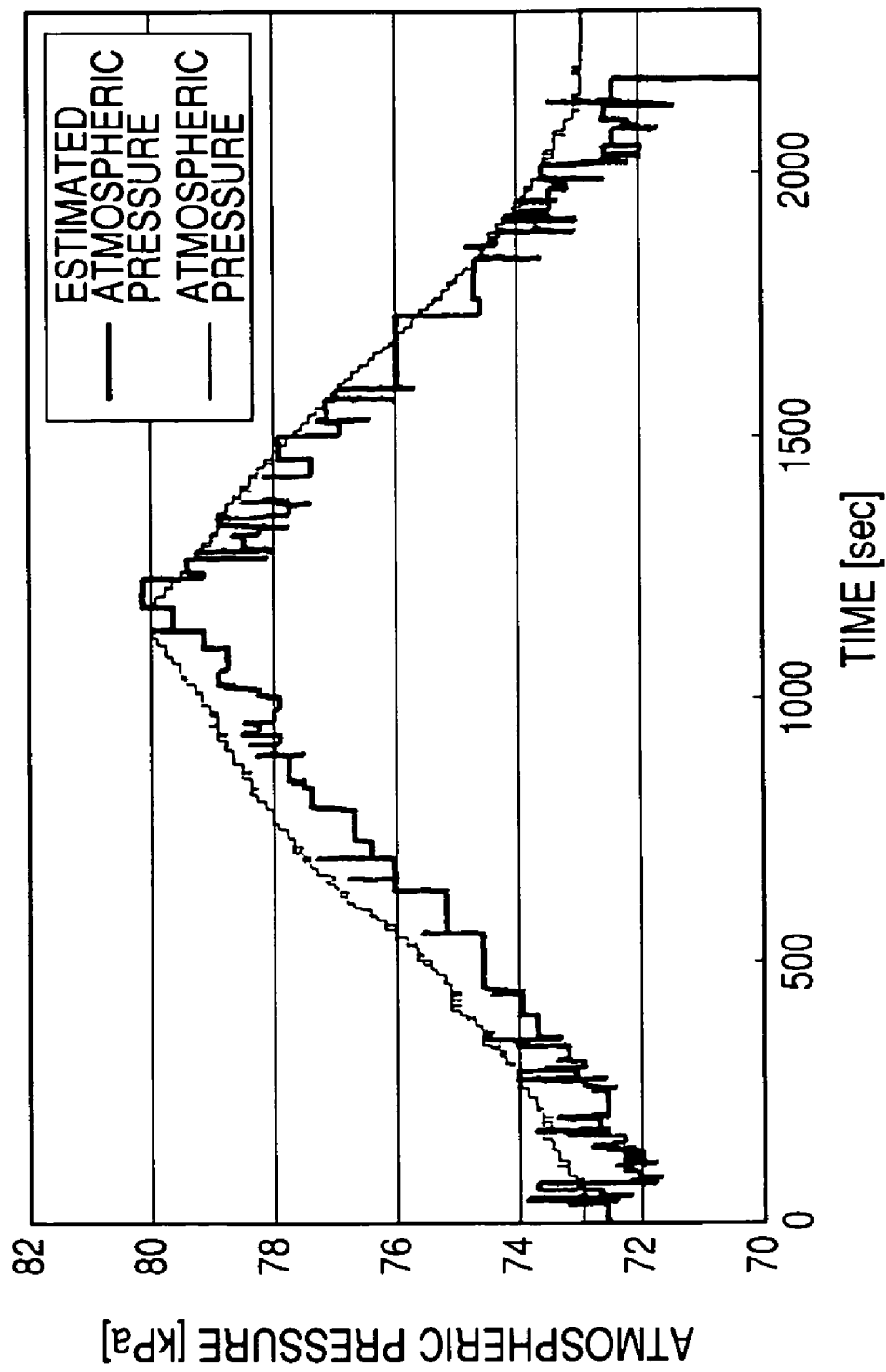
FIG. 11 is an explanatory diagram illustrating a correlation between an atmospheric pressure calculated from an intake air pressure and an actual atmospheric pressure.

FIG. 11 shows an atmospheric pressure calculated by the atmospheric pressure calculating unit 41 (an estimated atmospheric pressure in the figure) and an atmospheric pressure actually detected by the atmospheric pressure sensor. Of these, a portion where the calculated atmospheric pressure becomes flat indicates a time for which the atmospheric pressure cannot be updated due to the running condition of the engine not reaching to a predetermined condition. The measurement was carried out at a highland whose altitude is in the order of 2100 m in such a manner that after a drastic descent was made from a location of a high altitude to a location of a low altitude, a drastic ascent was made back to the location of a high altitude. Thus, at the highland having such a difference in altitude, the atmospheric pressure fluctuates largely, and consequently, if the fuel injection quantity is not controlled by detecting the atmospheric pressure accurately, the originally designed engine torque and output cannot be obtained. However, as is clear form the figure, the calculated atmospheric pressure follows the actual atmospheric pressure well (with an error falling within several percents), and it is found that in case the fuel injection quantity, namely the fuel injection time is controlled as has been described previously using the calculated atmospheric pressure, the originally designed engine torque and output can be obtained.

Note that while, in this embodiment, the example has been described in which the atmospheric pressure is used for calculation of the pressure of fuel supplied to the injector, the atmospheric pressure detecting apparatus according to the invention can be applied to anything provided that it is designed to detect the atmospheric pressure, and for example, in a case where the fuel injection quantity is controlled by detecting the volume flow rate of fuel flowing into the engine, the atmospheric pressure detecting apparatus of the invention can be applied to such as to detect the atmospheric pressure for correction of the volume flow rate according to air density.

In addition, while the embodiment has been described in detail with respect to the so-called multi-cylinder engine having four cylinders, the invention can equally be developed to a single-cylinder engine.

In addition, the engine control unit can be substituted by various types of arithmetic circuits instead of the microcomputer.

INDUSTRIAL APPLICABILITY

As has been described heretofore, according to the apparatus and method for detecting an atmospheric pressure for a four-stroke engine according to the invention, since the atmospheric pressure is designed to be detected from the intake air pressure when the load of the four-stroke engine is light and just before the inlet valve opens, the atmospheric pressure can accurately be detected from the intake air pressure just before the inlet valve opens according to the running conditions of the engine such as engine load and engine rotational speed without using an atmospheric pressure sensor, whereby the number of components and the production costs can be attempted to be reduced.

Additionally, according to the apparatus and method for detecting an atmospheric pressure for a four-stroke engine according to the invention, since the atmospheric pressure is designed to be detected from the intake air pressure just before the inlet valve opens when the predetermined engine rotational speed area which has been set in advance is reached, the atmospheric pressure can be detected more accurately.

What is claimed is:

1. An atmospheric pressure detecting apparatus for a four-stroke engine comprising a nonpressure regulator mounted on a pump for pressurizing fuel in a fuel tank for regulating an upper limit value for the pressure of fuel pressurized by the pump, a fuel injection device for injecting fuel the upper limit of which is regulated by the regulator into an air induction passageway of the four-stroke engine and an air intake control valve provided in the air induction passageway, the atmospheric pressure detecting apparatus for a four-stroke engine being characterized by provision of intake air pressure detecting means for detecting an intake air pressure downstream of the air intake control valve, operating condition detecting means for detecting an operating condition of the four-stroke engine and atmospheric pressure detecting means for detecting an atmospheric pressure from an intake air pressure resulting when the load of the four-stroke engine is small and immediately before an inlet valve opens based on the operating condition of the four-stroke engine detected by the operating condition detecting means and the intake air pressure detected by the intake air pressure detecting means.

2. An atmospheric pressure detecting apparatus for a four-stroke engine as set forth in claim 1, wherein the atmospheric pressure detecting means detects an atmospheric pressure from the intake air pressure resulting immediately before the inlet valve opens when the operating condition of the engine detected by the operating condition detecting means resides within a predetermined engine rotational speed area which has been set in advance.

3. An atmospheric pressure detecting method for a four-stroke engine comprising a nonpressure regulator mounted on a pump for pressurizing fuel in a fuel tank for regulating an upper limit value for the pressure of fuel pressurized by the pump, a fuel injection device for injecting fuel the upper limit of which is regulated by the regulator into an air induction passageway of the four-stroke engine and an air intake control valve provided in the air induction passageway, the atmospheric pressure detecting method for a four-stroke engine being characterized by the steps of detecting an intake air pressure downstream of the air intake control valve, detecting an operating condition of the four-stroke engine and detecting an atmospheric pressure from an intake air pressure resulting when the load of the four-stroke engine is small and immediately before an inlet valve opens based on the operating condition of the four-stroke engine so detected and the intake air pressure so detected.

4. An atmospheric pressure detecting method for a four-stroke engine as set forth in claim 3, wherein an atmospheric pressure is detected from the intake air pressure resulting immediately before the inlet valve opens when the operating condition of the engine detected resides within a predetermined engine rotational speed area which has been set in advance.

* * * * *